(12) United States Patent
Schwab et al.

(10) Patent No.: US 9,784,564 B2
(45) Date of Patent: Oct. 10, 2017

(54) DEPLOYMENT MECHANISM FOR OPTICAL MEASUREMENT SYSTEM

(71) Applicant: Quality Vision International, Inc., Rochester, NY (US)

(72) Inventors: Frederick D. Schwab, Atlanta, NY (US); Edward T. Polidor, Webster, NY (US)

(73) Assignee: Quality Vision International, Inc., Rochester, NY (US)

( * ) Notice: Subject to any disclaimer, the term of this patent is extended or adjusted under 35 U.S.C. 154(b) by 39 days.

(21) Appl. No.: 14/946,218

(22) Filed: Nov. 19, 2015

(65) Prior Publication Data

US 2016/0178350 A1    Jun. 23, 2016

Related U.S. Application Data

(60) Provisional application No. 62/094,688, filed on Dec. 19, 2014.

(51) Int. Cl.
*G01B 11/02* (2006.01)
*G01B 5/012* (2006.01)

(52) U.S. Cl.
CPC ............ *G01B 11/022* (2013.01); *G01B 5/012* (2013.01)

(58) Field of Classification Search
CPC ........ G01B 11/022; G01B 5/008; G02B 7/32; G03B 13/36
See application file for complete search history.

(56) References Cited

U.S. PATENT DOCUMENTS

| 4,279,080 A | * | 7/1981 | Nakaya | G01B 7/012 33/561 |
|---|---|---|---|---|
| 4,580,900 A | | 4/1986 | Larsen | |
| 4,631,834 A | | 12/1986 | Hayashi et al. | |
| 5,615,489 A | * | 4/1997 | Breyer | G01B 5/012 33/503 |
| 5,825,666 A | * | 10/1998 | Freifeld | G01B 11/005 279/128 |
| 6,518,996 B1 | | 2/2003 | Polidor et al. | |
| 6,789,327 B2 | | 9/2004 | Roth et al. | |
| 7,538,960 B2 | | 5/2009 | Schwab et al. | |
| 7,812,971 B2 | | 10/2010 | Jackson et al. | |
| 7,916,398 B2 | | 3/2011 | Bloch | |
| 7,986,473 B2 | | 7/2011 | Bloch et al. | |

(Continued)

OTHER PUBLICATIONS

International Search Report and Written Opinion of the International Searching Authority in corresponding International Application No. PCT/US2015/062126, mailed Feb. 5, 2016 (9 pages).

*Primary Examiner* — Sang Nguyen
(74) *Attorney, Agent, or Firm* — Andrew J. Anderson, Esq.; Harter Secrest & Emery LLP

(57) ABSTRACT

An optical measurement system includes an optical sensor assembly for measuring an object located beneath the optical sensor assembly. A deployment mechanism is pivotally connected relative to the optical sensor assembly that moves a secondary measurement aid, such as a touch sensor, between a deployed position and a retracted position. When in the retracted position, the secondary measurement aid does not inhibit movement of the optical sensor with respect to the object being measured.

24 Claims, 7 Drawing Sheets

(56) References Cited

U.S. PATENT DOCUMENTS

| | | | |
|---|---|---|---|
| 8,601,701 B2* | 12/2013 | Wallace | G01B 21/042 33/503 |
| 9,097,612 B2 | 8/2015 | Kulawiec et al. | |
| 2004/0068881 A1 | 4/2004 | Moriarity et al. | |
| 2004/0109205 A1* | 6/2004 | Asano | G01B 11/306 358/448 |
| 2005/0166413 A1* | 8/2005 | Crampton | B25J 13/088 33/503 |
| 2005/0259271 A1* | 11/2005 | Christoph | G01B 11/007 356/601 |
| 2009/0003815 A1* | 1/2009 | Polidor | G02B 7/32 396/106 |
| 2010/0309546 A1 | 12/2010 | Seifert | |
| 2011/0000277 A1* | 1/2011 | MacManus | G01B 21/042 73/1.79 |
| 2011/0058159 A1* | 3/2011 | Weston | G01B 11/24 356/237.1 |
| 2012/0092615 A1 | 4/2012 | Izatt et al. | |
| 2014/0317941 A1* | 10/2014 | Patti | G01B 5/012 33/503 |

* cited by examiner

DEPLOYMENT MECHANISM FOR OPTICAL MEASUREMENT SYSTEM

STATEMENT REGARDING FEDERALLY SPONSORED RESEARCH OR DEVELOPMENT

None.

REFERENCE TO A "SEQUENCE LISTING"

Not applicable.

BACKGROUND OF THE INVENTION

This invention relates to an optical measurement system for optically inspecting an object.

Metrological machines are often employed for optical inspection of a manufactured object and for obtaining precise dimensional measurements of the manufactured object to ensure the object conforms to specifications. Such machines typically include a support or stage on which the object rests during inspection, and an optical sensor, such as a video camera, for recording and/or displaying images of the object. Generally, the video camera and the stage are movable with respect to one another so that different views of the object can be obtained at desired, precise locations. Such systems are often programmable, so that the same sequence of multiple images may be obtained for a number of similar manufactured objects.

Additionally, it is often desired to employ another measurement aid, such as a touch sensor, that either operates in conjunction with the video camera or is used independently of the video camera to obtain additional measurements. However, the present inventors recognized that a problem with many prior optical measurement systems is that the secondary measurement aid can inhibit movement between the primary optical sensor and the object to be measured, thus potentially compromising the ability to obtain measurements of the object at all desired locations. Further, although in some systems the secondary measurement aid could be removed, such removal can be time-consuming, thus compromising cycle time for obtaining all desired measurements when removal of the secondary measurement aid was otherwise not necessary.

BRIEF SUMMARY OF THE INVENTION

This invention provides an optical measurement system that comprises: an optical sensor assembly including an objective lens with an optical axis and a lens housing; a stage for placement of an object to be measured located beneath the optical sensor assembly, the stage and the optical sensor assembly being movable with respect to one another; and a deployment mechanism pivotally connected relative to the optical sensor assembly that moves a secondary measurement aid between a deployed position and a retracted position.

According to various embodiments, the deployment mechanism includes an attachment mount, wherein at least two different types of secondary measurement aids may be interchangeably attached thereto.

According to various embodiments, when the deployment mechanism is in the retracted position, no measurement aids inhibit movement of the optical sensor assembly with respect to an object to be measured on the stage.

According to various embodiments, when in the deployed position, the secondary measurement aid is aligned along the optical axis, and when in the retracted position, the secondary measurement aid is no lower than a lowest portion of the lens housing.

According to various embodiments, the stage and the optical sensor assembly are movable with respect to one another along each of the x, y and z axes, and when the deployment mechanism is in the deployed position, the secondary measurement aid is aligned along the optical axis, and when in the retracted position, the secondary measurement aid does not inhibit movement of the optical sensor assembly with respect to an object to be measured along each of the x, y, z axes.

According to various embodiments, a pivot axis of the secondary measurement aid is generally horizontal and may be above the objective lens. According to various embodiments, the secondary measurement aid is a touch sensor, and when in the deployed position, the touch sensor is aligned along the optical axis, and when in the retracted position, the touch sensor is no lower than a lowest portion of the lens housing. The touch sensor may include a stylus. When in the retracted position, the longitudinal axis of the touch sensor may be generally horizontal.

According to various embodiments, the secondary measurement aid is provided on a rotary table. When in the deployed position, the axis of rotation of the rotary table may be aligned along the optical axis of the objective lens.

According to various embodiments, the optical sensor assembly includes a camera, such as a video camera, or a scanning sensor.

According to various embodiments, the stage is movable along the x and y axes, and the optical sensor assembly is movable along the z axis. According to various embodiments, the secondary measurement aid comprises a mirror. When the mirror is in the deployed position, the mirror may be adjustably tiltable.

According to various embodiments, a touch sensor and a mirror are interchangeably attachable to an attachment mount of the deployment mechanism.

According to various embodiments, the deployment mechanism includes a pivot arm comprising a pivot connection at one end and an attachment mount for the secondary measurement aid at an opposite end. The pivot arm may be movable between the deployed position and the retracted position by an actuator, such as an air cylinder.

According to various embodiments, the secondary measurement aid comprises a laser or a secondary lens for changing magnification or focal depth of the objective lens.

BRIEF DESCRIPTION OF THE SEVERAL VIEWS OF THE DRAWING(S)

DETAILED DESCRIPTION OF THE INVENTION

Figure 1:
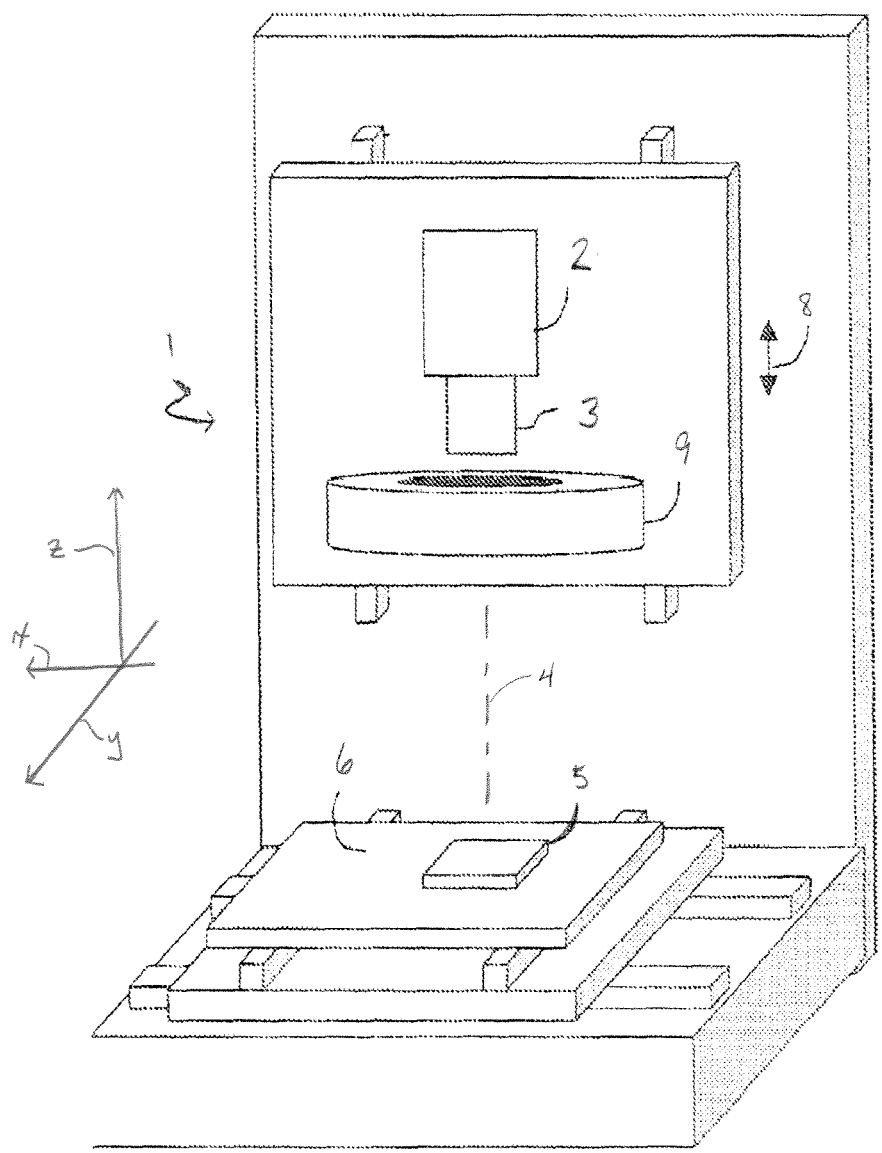
FIG. 1 illustrates an optical measurement system for which this invention is employed.

FIGS. 1 to 7 illustrate an optical measurement system 1 that incorporates various embodiments of this invention. As schematically illustrated in FIG. 1, system 1 includes an optical sensor assembly that includes an optical sensor 2 and an objective lens 3 having optical axis 4. The optical sensor assembly may further include other conventional components, such as lights 9 for illuminating the object 5 to be measured when the object 5 is placed on stage 6 located beneath optical sensor assembly. In this described embodiment, the optical sensor assembly includes a video camera 2 as the optical sensor.

The stage 6 and the optical sensor assembly are movable with respect to one another. In this illustrated embodiment, stage 6 is moveable along the x and y axes, and optical sensor assembly is movable along the z axes which is normal to the y axis, but other configurations are possible.

FIGS. 2 to 7 illustrate a deployment mechanism according to embodiments of this invention in more detail. Deployment mechanism 10 is pivotally connected relative to the optical sensor. Specifically, in this illustrated embodiment, deployment mechanism 10 includes a pivot arm 11, connected at pivotal connection 12. A secondary measurement aid is attached to the deployment mechanism 10 at an opposite end. In this illustrated embodiment, the secondary measurement aid includes touch sensor 14 comprising stylus 15. As an example, various touch sensors are available under the tradename Renishaw™ (Renishaw Inc., Hoffman Estates, Illinois, USA). Touch sensors include touch scanning sensors that contact the surface of an object along a preselected path, and touch trigger sensors that contact the surface of the object at multiple points. Generally, touch sensors may be used to measure features or contours of surfaces that are not easily accessible by the optical sensor, such as internal bores or threaded portions.

Figure 2:
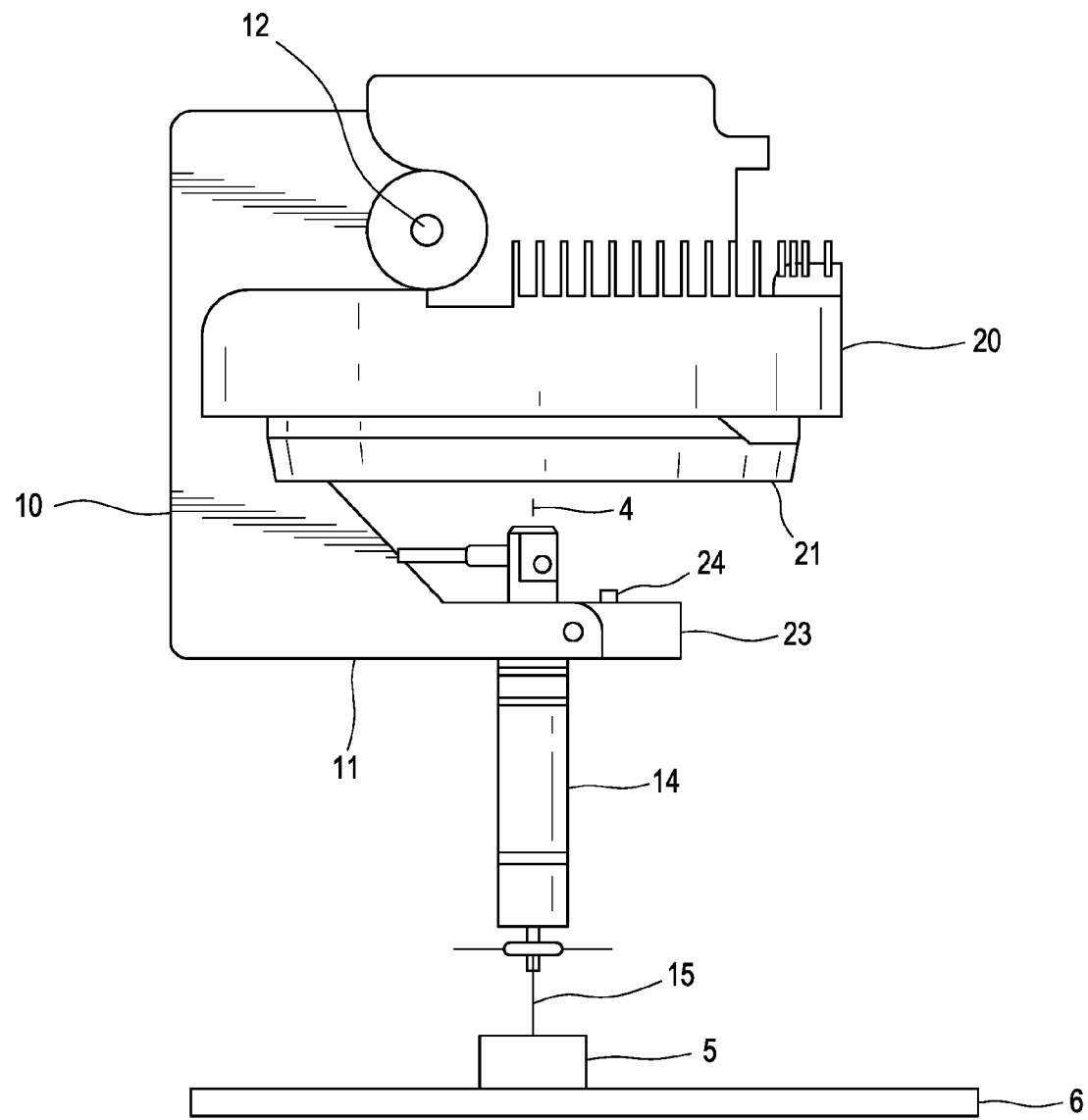
FIG. 2 is a side view of a deployment mechanism of this invention according to various embodiments, when a secondary measurement aid is in a deployed position.

FIG. 2 illustrates the secondary measurement aid in a deployed position. According to this illustrated embodiment, the longitudinal axis of touch sensor 14 is aligned with the optical axis 4 of the objective lens 3. The objective lens 3 and a light ring 9 are encased in lens housing 20.

Figure 3:
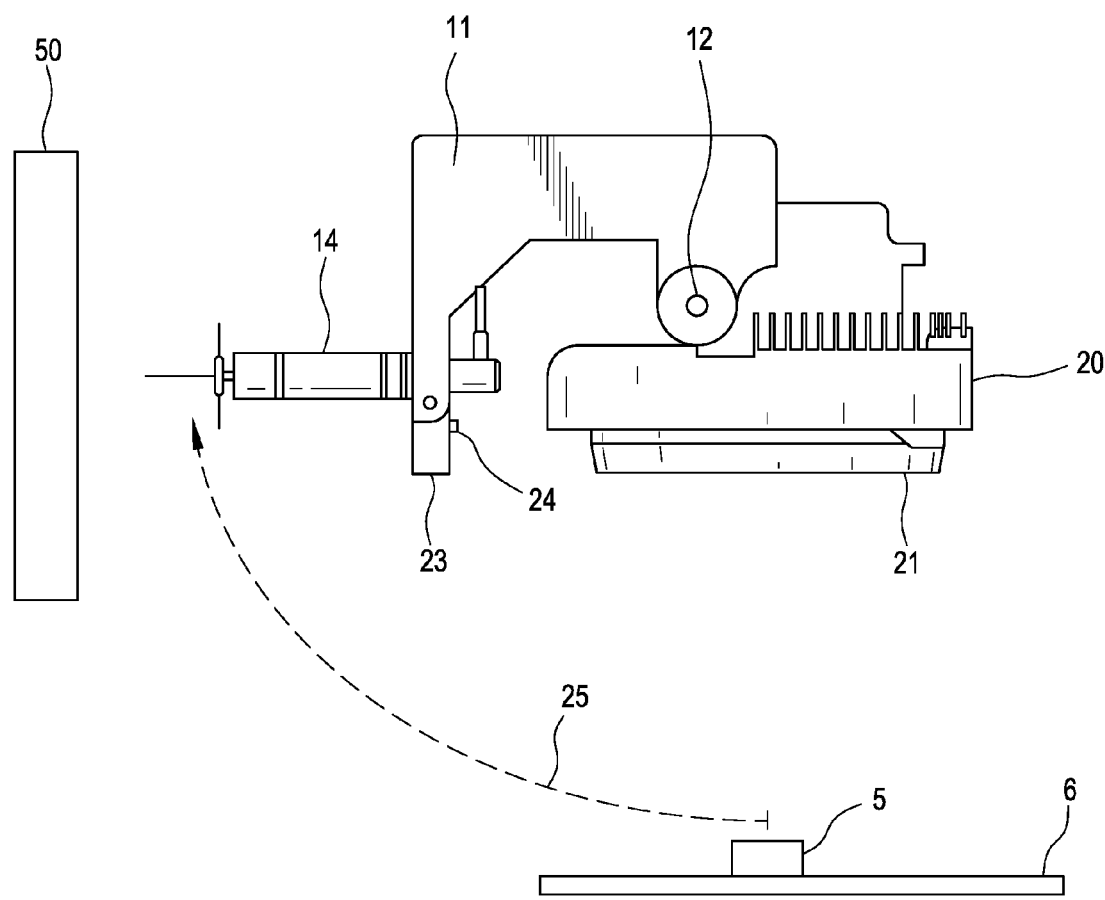
FIG. 3 is a side view of the deployment mechanism of FIG. 2, when a secondary measurement aid is in a retracted position.

FIG. 3 illustrates the secondary measurement aid in a retracted position, as the secondary measurement aid and pivot arm 11 have traveled along path 25. Accordingly, the secondary measurement aid, in this case touch sensor 14, does not inhibit movement of the optical sensor assembly with respect to object 5 to be the measured in any of the x, y or z axes. In other words, with the secondary measurement aid in this retracted position, optical sensor 2 and stage 6 can be moved fully in all directions with respect to one another, and viewing or optical imaging of the object 5 is not restricted. No measurement aids inhibit movement of the optical sensor assembly with respect to the object 5 to be measured on stage 6 or interfere with the field of view of the optical sensor.

In this embodiment, it can be seen that the touch sensor 14 secondary measurement aid is no lower than the lowest portion 21 of the lens housing 20. Touch sensor 14 thus accesses the same measurement volume as optical sensor 2. Also, pivot axis 12 is generally horizontal and is located above the objective lens.

Figure 4:
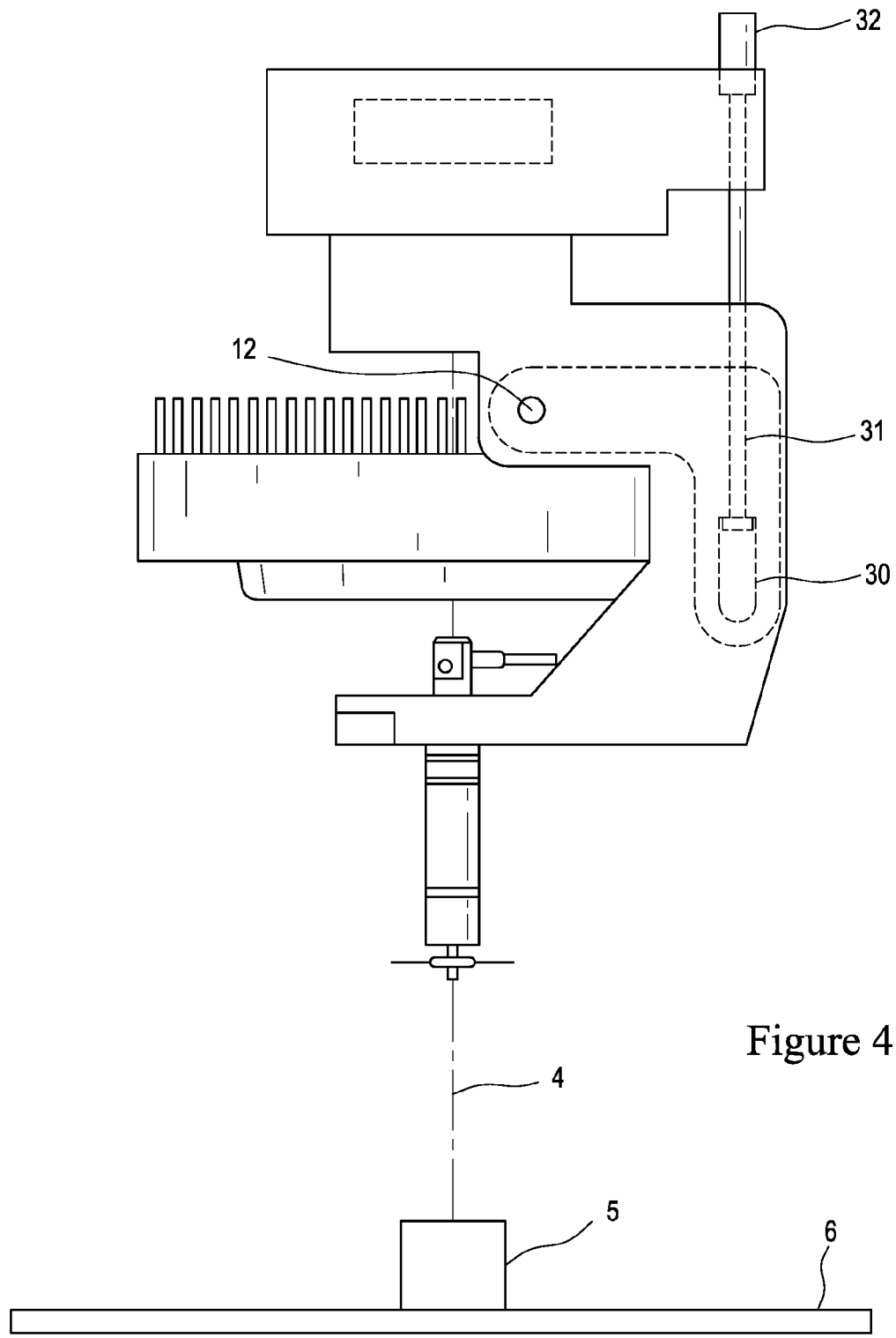
FIG. 4 is an opposite side view of the deployment mechanism of FIG. 2.

As illustrated in FIG. 4, an actuator 30 is provided to move the pivot arm 11 between the retracted and deployed positions. FIG. 4 illustrates an actuator arm 31 connected to an air cylinder 32, but other actuators may be employed, such as a ball screw, motorized rotary screw or linear motor.

It is desirable that each time the deployment mechanism 10 is returned to the deployed position, the secondary measurement aid attached thereto has consistent, reliable placement. Accordingly, an end-of-travel, hard stop may be provided for accurate return to the deployed position. If desired, this hard stop may be cushioned, for example, by a gas spring cushion, to prevent undue wear on parts. Additionally, it is desired to prevent axial motion of pivot arm at pivot axis 12. For example, radial angular contact bearings may be employed on at least one side of pivot axis 12 to prevent axial motion. As an example, a radial angular contact bearing may be provided on one side of pivot axis 12, and a standard radial bearing on the other side for additional support. Accordingly, all degrees of freedom of movement of pivot arm 11 are removed except along path 25; and the end-of-travel stop at the deployed position assures accuracy of the pivot arm reaching this deployed position while removing this final degree of freedom of movement of the pivot arm.

Alternately, a kinematic coupling between the pivot arm and the housing may be employed to assure the deployment mechanism 10 is returned accurately to the deployed position and to provide an end-of-travel stop. In this alternate embodiment, the pivot arm still travels along path 25 between the retracted position and the deployed position, but the pivot arm may be permitted to travel axially along the pivot axis. The pivot arm includes a physical mating feature that mates with a complementary physical mating feature on the apparatus housing. Once in the deployed position along path 25, the pivot arm is moved axially so that the complementary mating features interlock, thus providing the kinematic coupling that prevents movement of the pivot arm in all directions.

Other secondary measurement aids besides a touch sensor may be employed, such as a scanning sensor, a laser sensor, or a secondary lens for changing magnification or focal depth of the objective lens. The secondary measurement aid may be permanently attached to deployment mechanism 10, but according to various embodiments, different types of secondary measurement aids may be interchangeably attached to an attachment mount 23 at the end of pivot arm 11.

Figure 5:
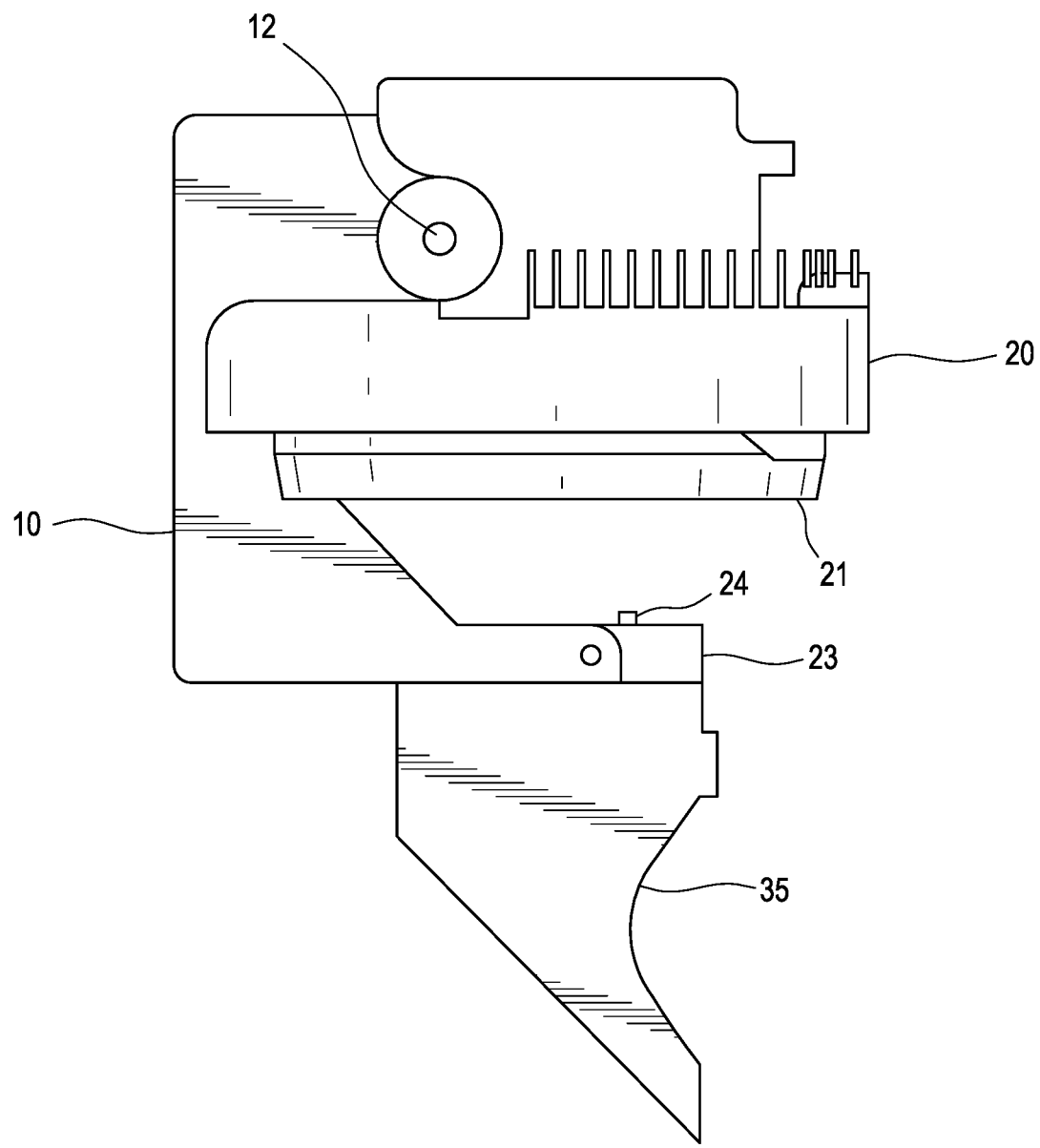
FIG. 5 is a side view of the deployment mechanism of FIG. 2, including another secondary measurement aid in a deployed position.

FIG. 5 illustrates an embodiment where touch sensor 14 has been replaced with mirror assembly 35. Mirror assembly 35 may be adjustably tiltable with respect to the optical sensor axis when in the deployed position.

Figure 6:
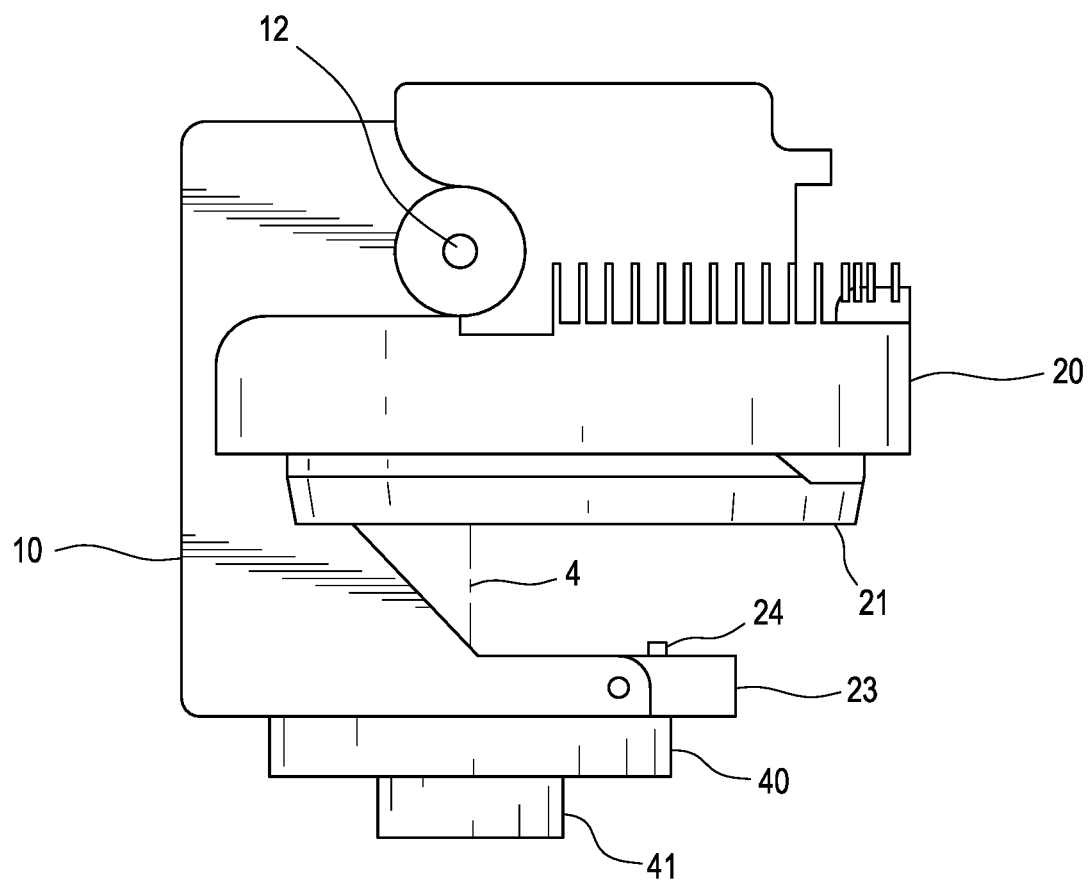
FIG. 6 is a side view of the deployment mechanism of FIG. 2, including a secondary measurement aid having a rotary table in a deployed position.
Figure 7:
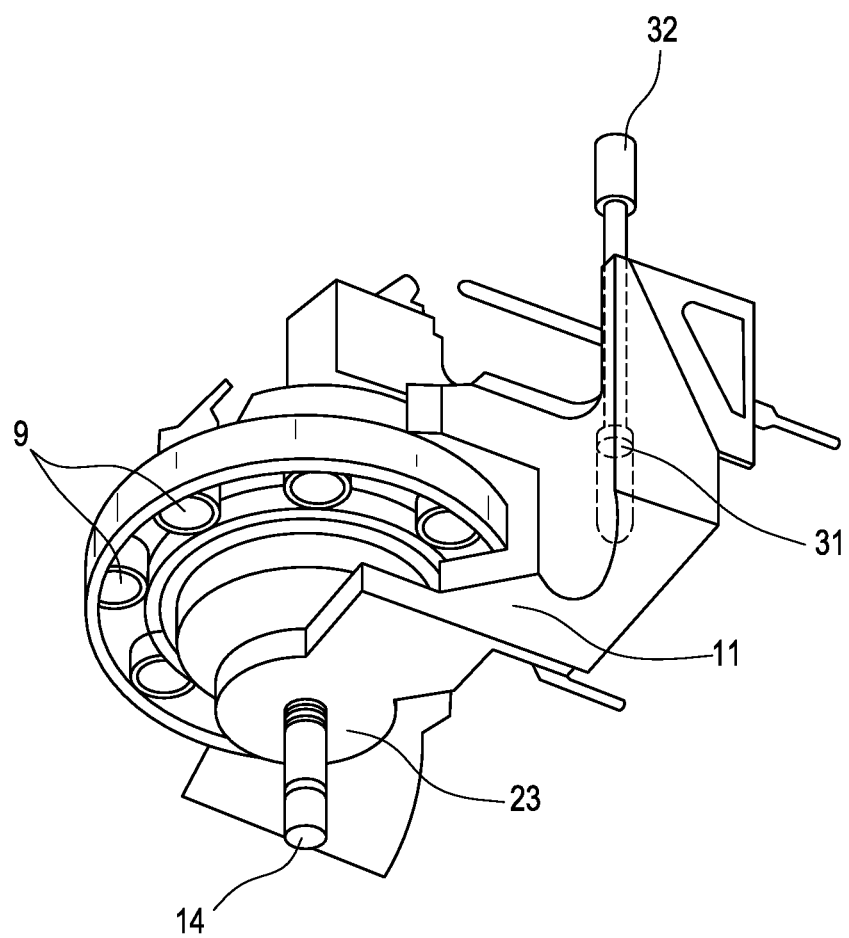
FIG. 7 is partial perspective view of the deployment mechanism of FIG. 2.

FIG. 6 illustrates an embodiment where the deployment mechanism includes a rotary table 40, which may be permanently or removably attached to attachment mount 23. A secondary measurement aid 41 is mounted to rotary table 40. When in the deployed position, the axis of rotation of rotary table 40 may be coincident with optical axis 4. As an example, the secondary measurement aid 41 may be a laser probe, with its sensing axis generally parallel to the stage, so that the laser probe may be pointed at different angles by rotating table 40. As another example, the secondary measurement aid 41 may be a small camera with a short focal distance, with its axis essentially parallel to the stage, so that this camera may be rotated by the rotary table 40. For these examples, the sides of an object 5 may be sensed with the secondary measurement aid 41 while the optical sensor 2 primarily senses the object top.

Other configurations of the secondary measurement aid are possible. As a first example, secondary measurement aid 41 may be an illumination source, such as a series of LEDs, a fiber bundle or a slit illuminator. Accordingly, the rotary table 40 may be rotated to change the orientation of illumination from this illumination source directed on object 5. For example, by rotating table 40 when in the deployed position, the orientation of light from the illumination source can be varied so that light strikes object 5 at different, desired angles of incidence in azimuth. Rotary table 40 may have an aperture of appropriate size that is concentric with its rotational axis to allow imaging with the optical sensor 2 through the aperture. As another example, secondary measurement aid 41 may be a mirror assembly, similar to the mirror assembly 35 of FIG. 5, but attached to the rotary table 40. Rotary table 40 may have an aperture to allow the optical sensor 2 to view images from the mirror assembly on rotary table 40. The mirror assembly on rotary table 40 may rotate 360 degrees so that all sides of object 5 are viewable. Additionally, internal walls of object 5 may be viewed by optical sensor 2 when the mirror is able to fit inside an internal cavity of the object.

The various secondary measurement aids may be attached to an attachment mount 23 located at the end of pivot arm 11. The attachment mount may be integrally formed with the pivot arm, or, as in the illustrated embodiment, attachment mount 23 may be a separate part located at the end of pivot arm 11. In either case, attachment mount includes removable fasteners 24, such as screws, so that an operator may interchange secondary measurement aids. However, a quick-connect attachment may be employed instead. Also, when in the retracted position illustrated in FIG. 3, a dockable device 50, including conventional pick-and-place elements, may be employed to interchange secondary measurement aids. Such dockable devices find use in changing of tools for various applications, such as in CNC machine centers, for example.

A representative operation of the embodiment shown in the figures will be described, although it is understood that other modes of operation with different steps, different sequence of steps, and different optical sensors and secondary measurement aids may be employed.

The first object 5 to be measured is placed on stage 6. Touch sensor 14 is moved from the retracted position to the deployed position via activation of actuator 30. The stage 6 and optical sensor 2 are moved with respect to one another to take a desired first set of measurements with touch sensor 14. Then, the touch sensor 14 is moved to the retracted position, and optical sensor and object 5 are repositioned to take a second set of measurements employing optical sensor 2 that do not require deployment of the touch sensor. It will be appreciated that since the touch sensor has been moved to the retracted position by the deployment mechanism of this invention, movement of the optical sensor assembly with respect to the object being measured is not inhibited, thereby permitting optical measurements that otherwise may not have been possible, or that would have at least required reorientation of the object on the stage.

At this point, a different secondary measurement aid may be interchanged with the touch sensor, either manually or automatically via an automated dockable device, and then the pivot arm is again moved to the deployed position. For example, if a mirror is attached, as in FIG. 5, a new set of optical measurements may be taken, employing the mirror to obtain optical measurements at angles offset from optical axis 4. Then, the mirror may be moved to the retracted position.

When no further measurements are required, a second object may be placed on the stage, and the sequence repeated. In the case where objects with the same manufacturing specifications are being measured sequentially, many optical metrology systems are programmable, so that the system takes the same sets of measurements, and positions each of the measurement aids in desired positions, with minimal operator intervention.

While this invention has been illustrated and described in connection with certain embodiments, it will be apparent that this invention is capable of further modifications, alternatives and improvements which may subsequently made by those skilled in the art and which are also intended to be encompassed by the following claims.

The invention claimed is:

1. An optical measurement system, comprising:
   an optical sensor assembly including an objective lens with an optical axis and a lens housing;
   a stage for placement of an object to be measured located beneath the optical sensor assembly, the stage and the optical sensor assembly being movable with respect to one another along each of the x, y and z axes; and
   a deployment mechanism pivotally connected relative to the optical sensor assembly that pivotally moves a secondary measurement aid relative to the optical sensor assembly between a deployed position and a pivotally retracted position,
   the deployment mechanism including an attachment mount, wherein at least two different types of secondary measurement aids may be interchangeably attached thereto;
   wherein when in the deployed position, the secondary measurement aid is aligned along the optical axis, and when in the retracted position, the secondary measurement aid does not inhibit movement of the optical sensor assembly with respect to an object to be measured along each of the x, y, z axes.

2. The optical measurement system of claim 1, wherein the optical sensor assembly includes a camera or a scanning sensor.

3. The optical measurement system of claim 2, wherein the optical sensor assembly includes a video camera.

4. The optical measurement system of claim 1, wherein a pivot axis of the deployment mechanism is generally horizontal.

5. The optical measurement system of claim 4, wherein a secondary measurement aid attached to the attachment mount is moveable along an arcuate path between the deployed position and the retracted position, the pivot axis of the attached secondary measurement aid is no lower than the objective lens, and when in the deployed position, the secondary measurement aid is aligned along the optical axis.

6. The optical measurement system of claim 1, wherein the stage is movable along the x and y axes, and the optical sensor assembly is movable along the z axis.

7. The optical measurement system of claim 1, wherein the secondary measurement aid comprises a touch sensor.

8. The optical measurement system of claim 7, wherein when the touch sensor is in the deployed position, a longitudinal axis thereof is aligned with the optical axis, and when the touch sensor is in the retracted position, the longitudinal axis thereof is generally horizontal.

9. The optical measurement system of claim 1, wherein the secondary measurement aid comprises a mirror.

10. The optical measurement system of claim 9, wherein when the mirror is in the deployed position, the mirror is adjustably tiltable.

11. The optical measurement system of claim 1, wherein the deployment mechanism comprises a pivot arm comprising a pivot connection at one end and the attachment mount at opposite end.

12. The optical measurement system of claim 11, wherein all degrees of freedom of movement of the pivot arm are removed except for movement along an arcuate path between the retracted position and the deployed position, and wherein the system further comprises an end-of-travel stop for the pivot arm accurately reaching the deployed position, said end-of-travel stop removing a final degree of freedom of movement of the pivot arm.

13. The optical measurement system of claim 12, wherein the pivot arm is movable between the deployed position and the retracted position by an actuator.

14. The optical measurement system of claim 13, wherein the actuator comprises an air cylinder.

15. The optical measurement system of claim 1, wherein the secondary measurement aid comprises a laser.

16. The optical measurement system of claim 1, wherein a touch sensor and a mirror are interchangeably attachable to the attachment mount.

17. The optical measurement system of claim 1, wherein the secondary measurement aid comprises a secondary lens for changing magnification of the objective lens.

18. The optical measurement system of claim 1, wherein the secondary measurement aid is provided on a rotary table attached to the attachment mount.

19. The optical measurement system of claim 1, wherein the deployed position and the retracted position vary by about 90 degrees.

20. The optical measurement system of claim 1, wherein the at least two different types of secondary measurement aids may be automatically interchangeably attached to the attachment mount.

21. The optical measurement system of claim 1, wherein when a secondary measurement aid attached to the attachment mount is in the retracted position, the secondary measurement aid is no lower than a lowest portion of the lens housing.

22. An optical measurement system, comprising:
an optical sensor assembly including an objective lens with an optical axis and a lens housing;
a stage for placement of an object to be measured located beneath the optical sensor assembly, the stage and the optical sensor assembly being movable with respect to one another; and
a secondary measurement aid pivotally connected relative to the optical sensor assembly, said secondary measurement aid pivotally moveable relative to the optical sensor assembly along an arcuate path between a deployed position and a pivotally retracted position, a pivot axis of the secondary measurement aid being generally horizontal and no lower than the objective lens, and when in the deployed position, the secondary measurement aid is aligned along the optical axis.

23. An optical measurement system, comprising:
an optical sensor assembly including an objective lens with an optical axis and a lens housing;
a stage for placement of an object to be measured located beneath the optical sensor assembly, the stage and the optical sensor assembly being movable with respect to one another;
a deployment mechanism pivotally connected relative to the optical sensor assembly that moves a touch sensor between a deployed position and a retracted position,
when in the deployed position, the touch sensor is aligned along the optical axis,
when in the retracted position, the touch sensor is no lower than a lowest portion of the lens housing.

24. An optical measurement system, comprising:
an optical sensor assembly including an objective lens with an optical axis and a lens housing;
a stage for placement of an object to be measured located beneath the optical sensor assembly, the stage and the optical sensor assembly being movable with respect to one another;
a deployment mechanism pivotally connected relative to the optical sensor assembly that pivotally moves a secondary measurement aid relative to the optical sensor assembly between a deployed position and a pivotally retracted position, the secondary measurement aid being mounted to a rotary table;
wherein when in the deployed position, an axis of rotation of the rotary table is aligned along the optical axis; and
when in the retracted position, the secondary measurement aid does not inhibit movement of the optical sensor assembly with respect to an object to be measured along each of the x, y, z axes.

* * * * *